Figure 3:
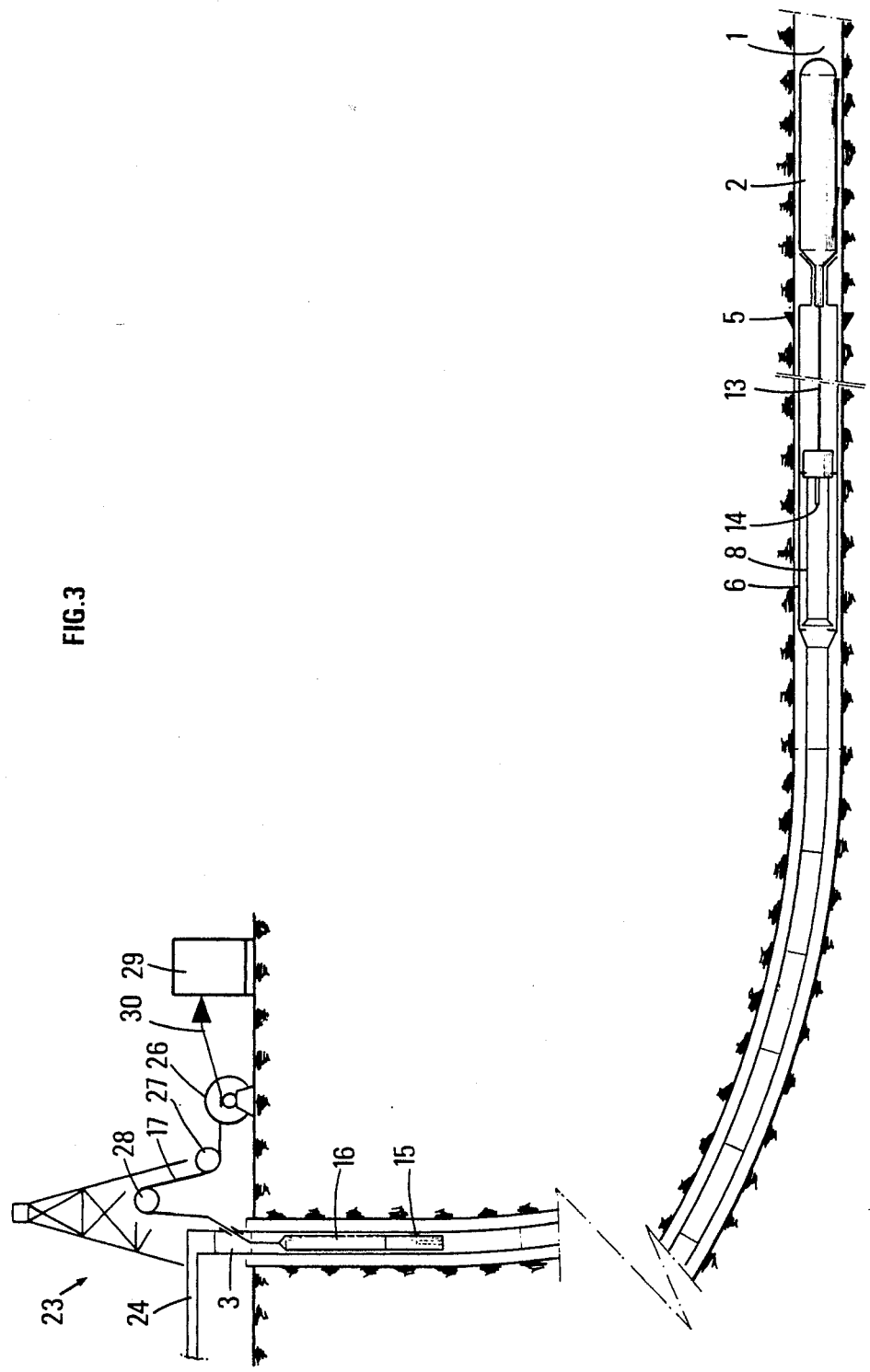

United States Patent [19]

Wittrisch

[11] Patent Number: 4,945,987
[45] Date of Patent: Aug. 7, 1990

[54] METHOD AND DEVICE FOR TAKING MEASUREMENTS AND/OR CARRYING OUT INTERVENTIONS IN A SHARPLY INCLINED WELL SECTION AND ITS APPLICATION TO PRODUCTION OF SEISMIC PROFILES

[75] Inventor: Christian Wittrisch, Rueil Malmaison, France

[73] Assignee: Institut Francais du Petrole, Rueil Malmaison, France

[21] Appl. No.: 251,701
[22] PCT Filed: Dec. 30, 1987
[86] PCT No.: PCT/FR87/00524
§ 371 Date: Sep. 27, 1988
§ 102(e) Date: Sep. 27, 1988
[87] PCT Pub. No.: WO88/05111
PCT Pub. Date: Jul. 14, 1988

[30] Foreign Application Priority Data

Dec. 31, 1986 [FR] France ................. 86 18416

[51] Int. Cl.⁵ ............ E21B 23/00; E21B 47/00; E21B 49/00
[52] U.S. Cl. ................. 166/250; 166/65.1; 166/382; 166/385
[58] Field of Search ............ 166/250, 254, 255, 252, 166/381, 308, 382, 385, 387, 64, 65.1, 66, 69, 72, 77; 175/40, 45, 50, 61, 62, 104, 317, 318

[56] References Cited

U.S. PATENT DOCUMENTS

| | | | |
|---|---|---|---|
| 4,062,551 | 12/1977 | Base | 277/102 |
| 4,457,370 | 7/1984 | Wittrisch | 166/250 |
| 4,484,628 | 11/1984 | Lanmon, II | 166/250 |
| 4,485,870 | 12/1984 | Walulik | 166/250 |
| 4,488,597 | 12/1984 | Hoppe et al. | 166/250 |
| 4,500,155 | 2/1985 | Chevalier | 339/94 M |
| 4,570,709 | 2/1986 | Wittrisch | 166/250 |
| 4,664,189 | 5/1987 | Wittrisch | 166/66 |
| 4,690,214 | 9/1987 | Wittrisch | 166/250 |

FOREIGN PATENT DOCUMENTS

| | | |
|---|---|---|
| 0077275 | 4/1983 | European Pat. Off. . |
| 0143192 | 6/1985 | European Pat. Off. . |
| 0174648 | 3/1986 | European Pat. Off. . |
| 0198764 | 10/1986 | European Pat. Off. . |
| 2544013 | 10/1984 | France . |
| 2547861 | 12/1984 | France . |

Primary Examiner—Bruce M. Kisliuk
Attorney, Agent, or Firm—Antonelli, Terry, Stout & Kraus

[57] ABSTRACT

Method and device for carrying out measurements and/or interventions in a well section which is substantially inclined with respect to the vertical or horizontal with a set of instruments provided at the bottom of a rigid string. In the method, a set or assembly of instruments is positioned or maintained positioned in an extension of the string at the lower end of the string, the assembly being in a first position relative to the end. The assembly and the bottom part of the string are introduced into the well and the assembly is advanced into the well by progressively pushing the end of the string until the assembly reaches a desired position, then the assembly is released and disengaged from a first position and brought into a second position wherein the assembly rests on a wall of the well and wherein it is mechanically decoupled from the string. The connection between the assembly and the string being provided by a flexible line and, thereafter, measurement and/or intervention is carried out.

14 Claims, 4 Drawing Sheets

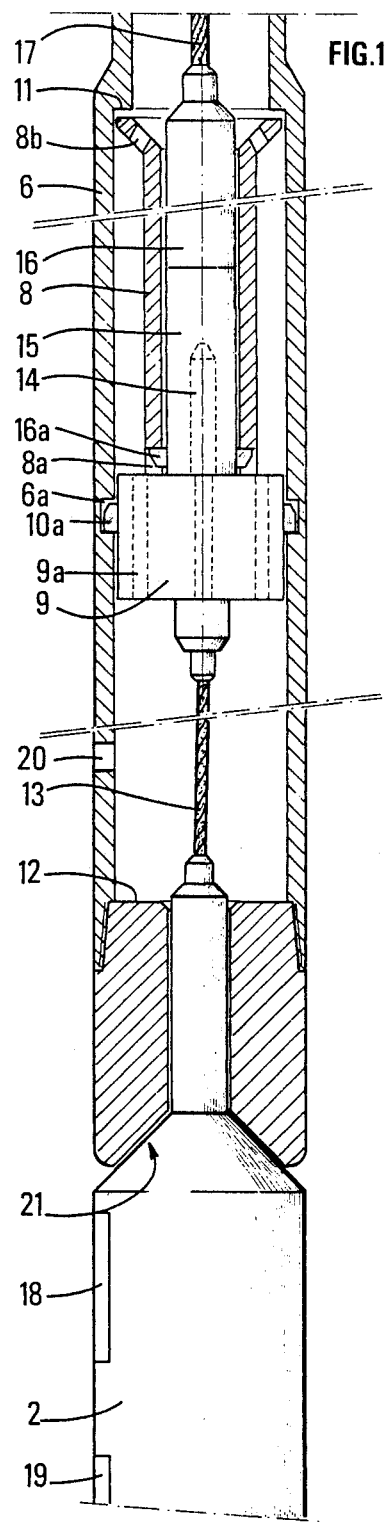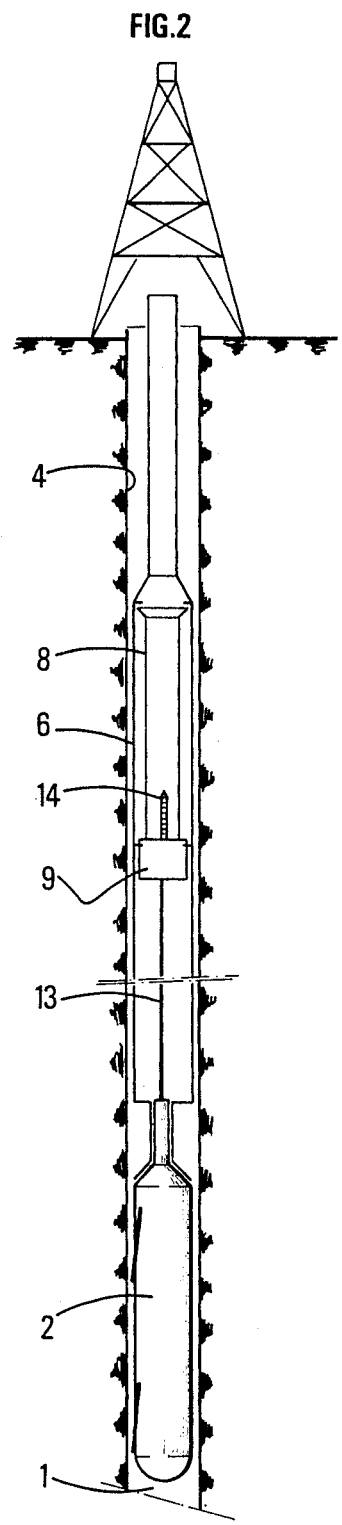

METHOD AND DEVICE FOR TAKING MEASUREMENTS AND/OR CARRYING OUT INTERVENTIONS IN A SHARPLY INCLINED WELL SECTION AND ITS APPLICATION TO PRODUCTION OF SEISMIC PROFILES

The present invention relates to a method and a device for carrying out, in sections of wells sharply inclined to the vertical, or horizontal sections, operations such as measurements and/or interventions with the aid of specialized instruments.

The invention applies in particular when measurements and/or interventions are to be made with a set of one or more instruments which must be isolated from the drilling string which allowed the set to be placed in a section of the well. Such situations may be encountered when seismic profiles are to be produced.

The present invention in particular allows seismic profiles to be produced by horizontal displacement, or displacement sharply inclined to the vertical, of the set of instruments. Such profiles will henceforth be termed "horizontal seismic profiles (HSP)."

The measurements made for example include the recording of vibrations transmitted through geological formations to the set of instruments. By processing this information, a seismic profile may be made of rock strata located on both sides of a well or borehole which is horizontal or has a long inclined section, with said processing leading to knowledge of the shape of the top of a geological formation.

The measurements carried out may also include recording of the pressure and tempeature of the bottom, measurement (focused or unfocused) of the electrical resistivity of the formations, etc.

These measurements may be supplemented by viewing the well walls with a television camera, for example.

U.S. Pat. Nos. 4,457,370 and 4,570,709 have already proposed a method and a device for carrying out, with the aid of a specialized tool fitted with an electrical connector, measurements in a horizontal well section or one sharply inclined to the vertical. However, the method and device do not permit operations requiring isolation, such as mechanical uncoupling, of the instrument set with respect to the drilling string.

The same applies to the technique according to French Patent 2,547,861 which in addition has the disadvantage of reducing the outside diameters of the instruments.

French Patent 2,544,013 has already proposed a device and method allowing measurements and/or interventions to be carried out in a well, in a zone of this well subjected to hydraulic compression. This invention does not allow a series of measurements and/or interventions to be carried out easily at points of the well that are spaced apart. Such a method and such a device apply particularly to listening at a point of a well zone subjected to hydraulic compression, but they are not suited for making measurements of seismic profiles.

Moreover, the protective housing of the instrument set requires reduction of the diameter of this set.

The invention furnishes a method for making measurements and/or interventions in a horizontal well section or one sharply inclined to the vertical with the aid of a set of one or more measuring and/or intervention instruments located at the lower end of a rigid tubular string subjected to longitudinal compression, said set having anchoring means such as arms. This method is characterized by the following stages, in succession:

the set is positioned or held in position in the extension of the string at the lower end of this string, the set being in a first position with respect to the end, the set and the lower part of the string are introduced into the well, the set is made to advance down the well until the set essentially reaches a desired position, the set is released and disengaged from its first position, then brought into a second position away from the first position, by activating anchoring means such that the set is held in the well, and moving the string forward and/or backward so that the set reaches the second position, and the measurement and/or intervention is carried out.

When the set is separated from the string by a flexible link, the set can be released and disengaged from its first position, then brought into a second position wherein the set rests on a wall of the well and wherein the set is mechanically uncoupled from the string.

When the set of instruments is fitted with a connector, the method may comprise the following intermediate and successive stages:

said set is equipped with a connecting plug pluggable in a liquid medium, a socket matching the plug connected to the set is introduced into the string, said socket being attached to the end of a transmission cable, the socket is moved in the string until it is connected with the plug connected to the instrument set, and the set is released and disengaged from its first position.

When releasing said set is effected by allowing locking means to move aside, said movement being controleld from the surface, the method may comprise the following stages:

said set is equipped with a base connected by locking means to the casing, a connector matching said base is introduced into the string, said connector being attached to the end of a control cable such as a pulling cable or a control line, and the locking means are made to move aside such as to release the set from the lower end of the string.

The set may be placed in a supporting guide (such as a seat) designed to keep the set as an extension of the string, and during the phase in which the set is brought into the second postion, the position of said set relative to said guide can be controlled.

To carry out measurments or interventions at several stations, the method may comrpise the following stages:

the socket and transmission cable and/or the connector and control cable are introduced into the string by means of a special connector provided with a lateral opening, this conenctor is attached to the upper end of the string, the set is lowered into the well by adding tubular elements above the connector for a length such that the connector remains in a vertical or slightly sloping part of the well, the set is released and disengaged from its first position, then brought into a second position wherein it rests on the wall of the well, where it is mechanically uncoupled from the string, the measurements and/or interventions are made, the set is displaced by raising the casing, then the casing is lowered again slightly to ensure mechanical uncoupling, then the above two steps are repeated as often as necessary.

When the string is raised, operation of said instrument set may be triggered.

Once the measurements and/or interventions have been made at one or more stations, the set may be brought into the first position relative to the string.

To carry out measurements and/or interventions in a horizontal well section or one strongly inclined to the vertical with the aid of a set of one or more measuring and/or intervention instruments located at the lower end of a rigid tubular string in longitudinal compression, the set being provided with a connector, the following stesp may be taken:

the set is fitted with connecting plug pluggable in a liquid medium and mounted on a base, the set is positioned or held in position as an extension of the string at the lower end of the string, the set being in a first position relative to the end, the set and the lower part of the string are introduced into the well, a matching socket and/or a connector and a control and/or transmission cable are introduced into the string by means of a special connector provided with a lateral opening, the connector matching the base, the connector being placed at the end of the cable controlling means for locking said set to the lower end of the string, with the socket matching the plug connected to the set and attached to the end of the transmission cable, this connector is attached to the upper end of the string, the set is lowered into the well by adding tubular elements above the connector until the set essentially reaches a desired position, the set is released and disengaged from its position then brought into a second position wherein it is mechanically uncoupled from the string, with the link between the set and the string being provided by a flexible line, and the measurement and/or intervention is carried out.

The invention also provides a method for making seismic profiles in a horizontal section of a well or one sharply inclined to the vertical in which at last one seismic source located at the surface and a set of instruments designed to measure seismic vibrations are used.

This method is characterized by implementing the above method and carrying out measurements with the set in the section of well while the source is in action.

The seismic source and the set designed to measure seismic vibrations may be moved, with the source and the set being placed essentially at right angles to each other.

The invention also provides a first device allowing measurements and/or interventions to be made in a section of well with the aid of a set of measuring and/or intervention instruments located at the lower end of string.

This device is characterized by having means cooperating with the end of the set, said means being designed to keep the set as an extension of the end when the latter is in an engaged position and designed to be inoperative when the set is in a disengaged position, said device also being characterized by the means having no protective housing.

The invention also provides a device allowing measurements and/or interventions to be made in a section of well with the aid of a set of mesuring and/or intervention instruments placed at the lower end of a string, the set having means for anchoring to the well wall such as arms, and means cooperating with the end of the set, the means being designed to keep the set as an extension of the end when the latter is in an engaged position, to protect the set, at least laterally, when it is in the engaged position, to be inoperative when the set is in a disengaged position and characterized by the holding and protection means having openings through which the anchoring means can operate in the course of time and with the clearance necessary to pass from the engaged position to the disengaged position.

The device is characterized by the means comprising in combination a seat, a base, and a link cable, the seat being designed to withstand the forces acting on the probe and being designed to keep the set as an extension of the end, the forces being in the opposite direction to the direction in which the string progresses in the well, the set being held in place against the seat by means of a link cable attached to the upper end of the set, and attached to a base made integral with the string, whereby the link cable passes through the seat.

The device allowing measurements and/or interventions to be made in a section of well with the aid of a set of measuring and/or intervention instruments located at the lower end of a string, the set having means for anchoring to the well wall such as arms, may comprise means cooperating with the end of the set, the means being designed to keep the set as an extension of the end when the latter is in an engaged position, to protect the set at least laterally when the latter is in the engaged position, and to be inoperative when the set is in a disengaged position, and the holding and protection means may have openings through which anchoring means may operate all the time and with the necessary clearance to move from the engaged position to the disengaged position.

The device allowing measurements and/or interventions to be made in a well section with the aid of a set of mesuring and/or intervention instruments located at the lower end of a rigid tubular string in longitudinal compression, the set of instruments being movable by remote control from the surface between a first position wherein the set is attached to the lower end of the string and a second position wherein the set is mechanically uncoupled from the string, the set begin connected to the surface by a cable, may have a special connector provided with a lateral opening traversed by the cable.

Figure 4:
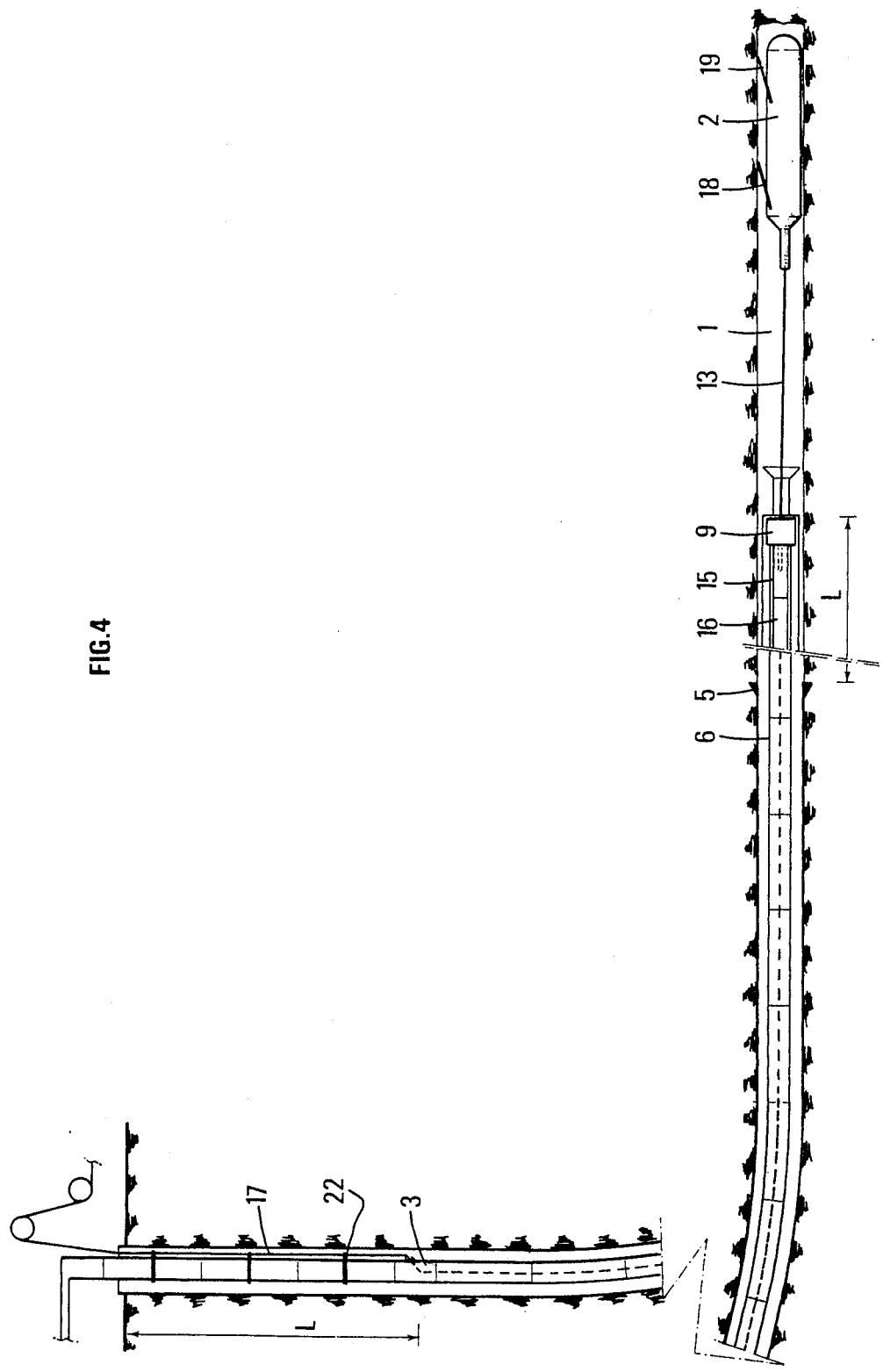
Figure 5:
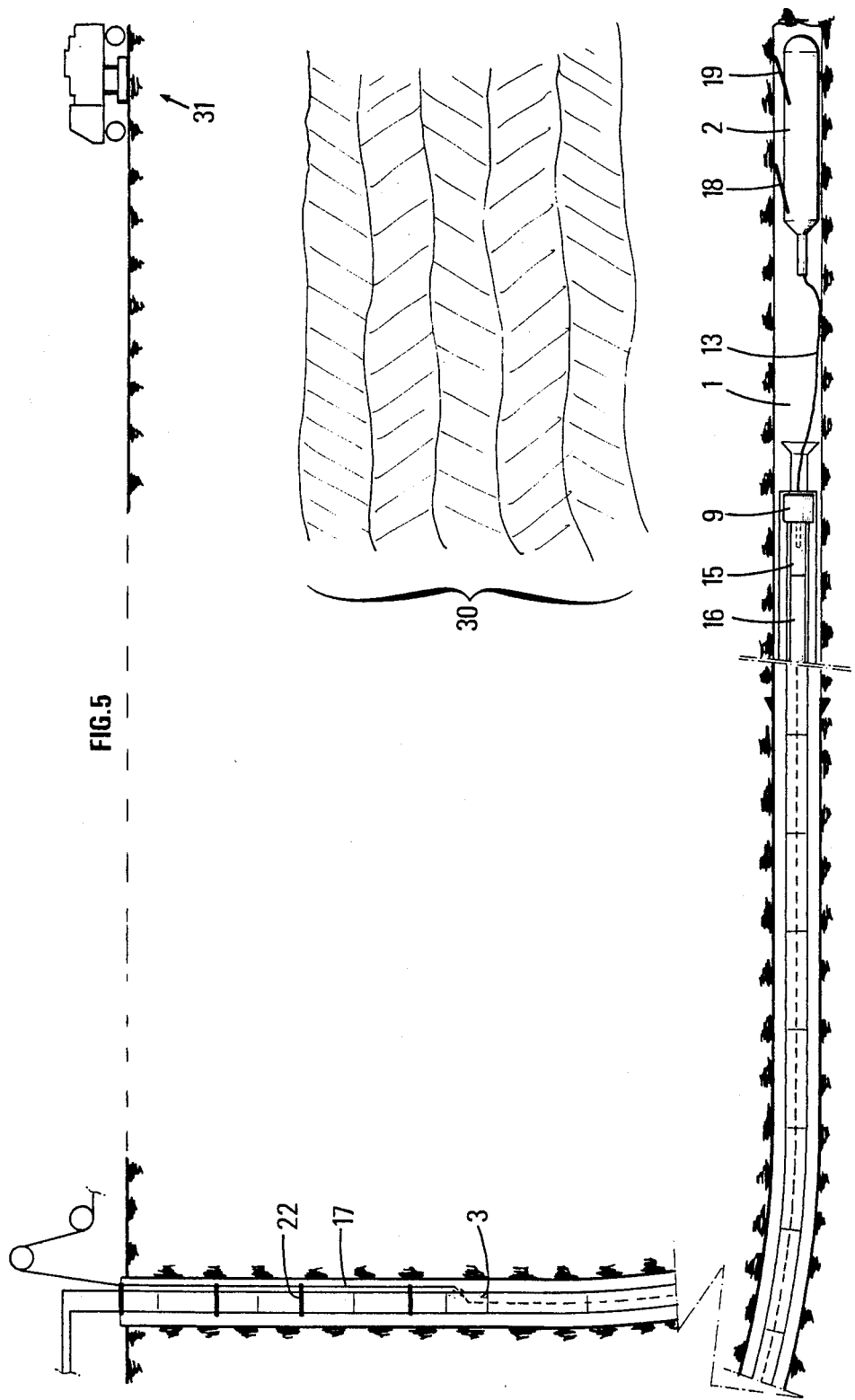

One embodiment of the invention is illustrated by the attached drawings wherein:

FIG. 1 is a detailed view of one embodiment of the device according to the invention, FIGS. 2 and 5 illustrate the various phases of implementation of the system according to the invention, applied to seismic measuring operations:

FIG. 2 shows schematically the phase wherein the device according to the invention is lowered into the well, FIG. 3 shows schematically the phase of connecting the device to the surface, FIG. 4 shows schematically the phase in which the instrument set and the end of the casing are spaced apart in a horizontal well section or one sharply inclined to the vertical and FIG. 5 shows schematically a working station in the course of the measuring phase.

FIG. 1 shows in detail one embodiment of the device according to the invention in a utilization phase where it is connected to the surface by a transmission cable 17 and wherein probe 2 or the set of one or more instruments is not yet isolated from the lower end of casing 6.

The upper end of probe 2 cooperates with a seat 21 of the lower end of casing 6 such that probe 2 is disposed as an extension of casing 6. The end of probe 2 and seat 21 are designed to withstand the forces acting on the probe, particularly during forced progression of the latter into certain difficult segments of the well such as curved or at least partially blocked segments.

The side of the seat located toward the outside of the casing is flared, in particular to facilitate remote-controlled centering of the probe. The probe is held in place on seat 21 by means of a link cable 13 attached to the upper end of probe 2, this cable passing through seat 21 and being kept tensioned or substantially tensioned to increase the quality of guidance of the probe on the seat by means of a base 9 made integral for this purpose with casing 6 by locking means 6a, 10a.

These locking means may be, but not exclusively, as shown, of the electric type and have dogs 10 integral with base 9 and remote-controlled by transmission cable 17, as well as an annular recess 6a provided in casing 6, said recess cooperating with said dogs to provide locking without rotational indexing of the base on the casing.

The indexing according to the casing axis is provided by cooperation of the upper end of centering guide 8 with upper stop 11 corresponding to a shoulder in casing 6.

Cable 13 has electric lines for transmission of information (control and/or measuring signals), power currents, etc. between the probe and electrical connector 15 integral with the base. Link cable 13 is flexible (i.e. of negligible stiffness) such as to ensure mechanical uncoupling between probe 2 and casing 6.

Base 9 is surmounted by centering guide 8 flared at its upper part to allow centering of loading bar 16 with a view to its fastening and connection to the base. The loading or ballast bar 16 which is attached to the lower end of transmission cable 17 is designed by its weight and hydraulic means to be moved from the surface in casing 6 by gravity and/or hydraulic pumping.

Bar 16 has an electrical connector 15 which is a female socket designed to cooperate with male multicontact plug 14 integral with base 9, and has means for anchoring the loading bar to the base, preventing their separation.

Examples of electrical connectors usable to constitute the assembly of plug 14 plus socket 15 are described in U.S. Pat. No. 4,500,155.

The anchoring means shown are of the electrical type and remote-controlled from the surface. These means, which can be moved aside, comprise a drive element 16a (preferably integral with loading bar 16 to be remote-controlled as directly and simply as possible) cooperating with a receiving element 8a integral with the base or cable support 9.

The electric or electrohydraulic dogs 16a constitute the drive element while groove 8a constitutes the receiving element.

The anchoring means, which may be mechanical, may have shearable washers surrounding socket 15 or loading bar 16 and cooperating with claws integral with tube 8 or base 9.

The upper flared end of centering guide 8, like base 9 or the lower end of casing 6, has orifices 8b, 9a, 20 respectively which allow circulation of fluid through casing 6 in particular for moving connector 16 through the casing.

The travel of base 9, which also allows casing 6 to be distanced from probe 2, is defined by means of two shoulders made in the casing defining an upper stop 11 and a lower stop 12, the fastening point of link cable 13 to base 9 having a shape designed to penetrate seat 21 when base 9 comes in contact with lower stop 12.

Probe 2 may have anchoring arms 18, 19 folded along its body when the probe is lowered into the well, and deployed hydraulically by electrical remote control from the surface by means of cables 13 and 17. These arms are anchored in the well wall by pressing the probe against this wall on the side diametrically opposite in order to carry out mesurements or operations. These arms may be connected to one or more skids applied to the well wall.

In the embodiment wherein probe 2 is used to detect and record longitudinal or transverse seismic vibrations which have been refracted, reflected, diffracted, etc. by geological formations, this probe may in particular have geophones, hydrophones, or dynamic accelerometers or hydrophones designed to record seismic waves.

This probe may also have sensors for picking up fluid pressure, temperature, application pressure of arms against the wall, measurment of probe orientation with respect to accelerometers or magnetometers, pendulums, compasses, electrical measurement electrodes, or any other sensor or instrument used in drilling, particularly for well-logging purposes.

Implementation of this device indicated hereinbelow with reference to FIGS. 2 to 5 which show the successive stages of this technique. FIG. 2 illustrates the first stage wherein probe or instrument set 2 is positioned as an extension of the lower end of string or casing 6, and is held in place by link cable 13, itself held by base 9, the latter fastened in turn to casing 6 by locking means 10-6a.

The device thus obtained is placed in the vertical well, one part of which may be provided with a lining 4, then lowered by adding tubular elements to the string until the latter essentially reaches the point where the last measuring and/or intervention will be made. The operations of the method according to the invention are normally carried out by raising the device in the well.

In this position, at the upper end of the casing, loading bar 16 is introduced, connected to transmission cable 17, and a special connector with a side window 3, generally called side entry sub, is set in place, through whose opening cable 17 passes.

This connector 3 may be of any known type, particularly of the type described in U.S. Pat. No. 4,062,551.

Special connector 3, attached to the string, is covered by injection head 24. Circulation of fluid for moving loading bar 16 toward base 9 is provided by means of injection head 24 while cable 17 is being paid out from winch 26 over return pulleys 27, 28 and through special connector 3 (FIG. 3).

When it comes in contact with base 9 and cooperates with male plug 14, loading bar 16 with its female socket 15 is anchored in centering guide 8 by means of electric dogs 16a controlled from the surface and cooperating with groove 8a provided in centering guide 8 integral with base 9.

Once the connection has been made, injection head 3 is removed and rigid pipe elements are assembled at the upper end of string 6 such as to ensure progression of the lower end of the casing where probe 2 is located until probe 2 has essentially reached the point of its first measurement and/or intervention.

Since cable 17 is betweent the surface and special connector 3 outside casing 6, centering devices 22 or rubber cable protectors attached to the rigid string ensure guidance of the cable over a certain distance. These centering devices can be of any known type, particularly of the type sold by the Weatherford-Stabilia company under the name Control Line.

The distance L separating the locations where the first and second measurements or interventions are made is essentially equal to the distance L between the special connector and the upper end of the casing when the lower end of the latter is essentially at the level of the first of the measurements.

When probe 2 is in the position of the first measurement and/or intervention, it is separated from the end of casing 6. This separation is only possible after locking means 6a-10 have been released from the surface. Probe 2 is then disengaged from the casing by pumping fluid (the injection head having been replaced) with the risk of jamming link cable 13 if probe 2 does not distance itself sufficiently from casing 6, and/or anchoring arms 18 and 19 of the probe to the well wall while raising the casing to bring base 9 against the lower stop of casing 12.

The combination of pumping while base 9 is held by cable 17 and raising casing 6 after probe 2 has been anchored to the well wall shows that it is easier to move the probe away from the casing by these combined means than by (1) anchoring the probe and raising the casing, alone, or (2) by pumping alone.

By continuing to raise the casing, possibly with pumping as well, one ensures that the link cable is tensioned, even if the anchored probe moves (FIG. 4), before lowering the casing again by 0.5 m for example such as to mechanically uncouple or isolate the probe from the casing (FIG. 5) and thus protect the probe or instrument set from the vibrations of the casing.

With this arrangement, and in this first measurement position or at the first measuring station, the probe may be placed in service and the measuring signals from the probe and the electric current supplying it are transmitted from and to surface station 29 through conductors incorporated into cables 13 and 17. The electrical link between these conductors and station 29 is created in known fashion by a set of brushes rubbing on collecting rings integral with the shaft of winch 26.

Once the measurements and/or interventions have been made at the first station, the arms of the probe are detached, then the casing is raised by pulling the probe up to the second measurment and/or intervention station, for example 5 to 10 meters closer to the surface, probe 2 is anchored again, and finally casing 6 is lowered again slightly such as to repeat the uncoupling between the probe and the casing. At the upper end of the casing, the pipe elements are removed and the cable is wound onto winch 26.

The procedure is recommended at each station until special connector 3 is essentially at surface level. After the arms of the probe have been closed, transmission cable 17 may be tugged to replace the probe at the end of the casing, then, when base 9, by means of centering guide 8, comes to abut shoulder 1, locking means 9 and 10 are activated. Means 16a, 8a of anchoring loading bar 16 to guide 8 are then released.

The loading bar is then raised by the winch and special connector 3 is detached. Finally, probe 2 and casing 6 are raised in the same manner in which they were lowered.

For this method, series of measurements or interventions may be made in horizontal well zones which are sharply inclined (with respect to the vertical) or even vertical.

The method described allows particularly useful seismic profiles to be created when the well is horizontal or sharply inclined and the goal is to investigate precisely, in zones that would otherwise be difficult to explore by boring, geological foundations such as the top of a reservoir 30 or strata located on either side of the horizontal or sharply inclined portion of the well.

To made these seismic profiles by horizontal displacement, or horizontal seismic profiles, a seismic source 31 located on the surface of the ground, such as a thumper, is used, disposed essentially at right angles to or vertically above while it is at a measuring station. The seismic source is activated and the vibrations are recorded at the level of the probe.

After raising casing 6, probe 2 is placed at a new station and source 31 is relocated above it, and so forth throughout the possible measuring length of the well.

When access to the terrain (mountainous, marshy, inhabited, etc.) does not allow the seismic source to be operated at any point, the probe may make measurements at several measuring stations for a single source location. Conversely, it may be useful for one or more given stations to carry out several measurements each time seismic source 31 is moved.

The device may have a protective housing surrounding the probe. The latter may have openings allowing the probe arms to pass through such that they can be anchored to the well wall. A system of rotational indexing the probe with respect to the housing may be added to the device.

To allow the casing to advance in sharply inclined or horizontal wells, the casing is rigid in longitudinal compression in order in praticular to overcome friction around curves in the wells and avoid stressing the probe.

I claim:

1. A method for carrying out mesurements and/or interventions in a horizontal well section or a well section which is sharply inclined to the vertical with a set of one or more measurement and/or intervention instruments located at the lower end of a rigid tubular string under longitudinal compression, said set having anchoring means including arms characterized by the following stages:

said set is postioned or held in position as an extension of said string at said lower end of said string, said set being in a first position with respect to said end, said set and said lower end of said string are introduced into said well, said set is made to advance down said well until said set essentially reaches a desired position, said set is released and disengaged from its first position, then brought into a second position away from the first position by activating the anchoring means so that said set is held against a wall of the well, said string being moved forward and/or backward so that said set reaches said second position, and
the measurement and/or intervention is carried out;
said set being positioned as an extension of the string by exerting a tension stress on a cable which is connected to the set.

2. Method according to claim 1 wherein said set is separated from said string by a flexible link provided by said cable, characterized in that said set is released from its first position and then brought into the second position wherein said set rests on a wall of the well and wherein said set is mechanically uncoupled from said string.

3. Method according to claim 1 or 2 wherein the set of instruments is provided with a connecting plug characterized by having the following intermediate and successive stages:
said set is equipped with the connecting plug which is pluggable in a liquid medium,
a socket matching the connecting plug connected to said set is introduced into said string, said socket being attached to the end of a transmission cable extending to the surface,
said socket is moved in the string until said socket is connected with said plug connected to said set and
said set is released and disengaged from its first position.

4. A method according to claim 1 wherein said release of said set is effected by moving aside locking mens, said moving action being controlled from the surface; characterized by the following stages:
said stage is equipped with a base attached by the locking means to a casing of the string,
a connector matching said base is introduced into the string, said connector being attached to the end of a transmission cable comprising a pulling cable or a control line, and
said locking means are made to move aside so as to release said set from said lower end of said string.

5. Method according to claim 1 characterized in that:
said set is placed in a supporting guide to keep the set as an extension of string and
during the phase in which the set is brought into the second position, the position of said set relative to said guide is controlled.

6. Method according to claim 1 for carrying out measurements or interventions at several stations, characterized by the following stages:
a socket and a transmission cable and/or connector are introduced into the string by means of a special connector provided with a lateral opening,
said special connector is attached to the upper end of the string,
said set is lowered into the well by adding tubular elements above the special connector for a link such that said special connector remains in a vertical or slightly sloping part of the well,
said is released and disengaged from its first position, then brought into the second position wherein the said set rests on the wall of the well where said set is mechanically uncoupled from said string,
the measurements and/or interventions are made,
said set is displaced by raising the string, then the string is lowered again slightly to ensure mechanical uncoupling, and then
the above two steps are repeated as necessary.

7. Method according to claim 1 wherein said string is reised, characteized by triggering the operation of said instrument set while said string is being raised.

8. Method according to claim 1 characterized in that once the measurements and/or interventions have been carried out at one or more stations, said set is brought into said first position relative to said string.

9. Method for creating seismic profiles in a horizontal well section or one sharply inclined to the vertical, wherein at least one seismic source located at the surface and a set of instruments designed to measure seismic vibrations are used, characterized by the method according to claim 1 being implemented and by measurements being made with said set in said well section while said source is in action.

10. Method according to claim 9 characterized by moving said seismic source and said set designed to measure said seismic vibrations, said source and said set being located essentially at right angles to each other.

11. Method for carrying out measurements and/or interventions in a horizontal well section or a well section sharply inclined to the vertical with a set of one or more measuring and/or intervention instruments located at the lower end of a tubular string rigid in longitudinal compression, said set being provided with a conencting plug, characterized by the following stages:
said set is fitted with said connecting plug pluggable in a liquid medium and mounted on a base,
said set is positioned or held in position as an extension of said string at the lower end of said string, said set being in a first position relative to said end,
said set and the lower end of said string are introduced into the wall,
a matching socket and/or a loading bar and a control and/or transmission cable are introduced into the string by means of a special connector provided with a lateral opening, said loading bar matching said vase, said loading bar being placed at the end of the transmission cable controlling means for locking said set to the lower end of said string, with said socket matching said plug connected to said set and attached to the end of said transmission cable,
said special connector is attached to the upper end of the string,
said set is lowered into the well by adding tubular elements above the special connector until said set essentially reaches a desired position,
said set is released and disengaged from its first position then brought into the second position wherein said set is mechanically uncoupled from said string, with a link between said set and said string being provided by a flexible line, and
the measurement and/or intervention is carried out.

12. Device for carrying out measurements and/or interventions in a section of a well with a set of measuring and/or intervention instruments located at the lower end of a string, said device having means cooperating with said end and said set, said means being designed to hold said set as an extension of said end when said set is in an engaged position and designed to be inoperative when said set is in a disengaged position, characterized by said means having, incombination, a seat, a base, and a link cable, said seat being designed to withstand the stresses on said set and designed to hold said set as an extension of said end, the stress is being in a direction opposite to the direction in which the string advances in said well, said set being held in place on said seat by means of said link cable attached to the upper end of said set and attached to a base made integral with the string, said link cable passing through said seat and said link cable being held under tension.

13. Device according to claim 12, wherein said instrument set is moveable by remote control from the surface between a first position wherein said set is attached to the lower end of said string and a second position wherein said set is mechanically uncoupled from said string, said set being connected to the surface by a transmission cable, characterized by having a special connector provided with a lateral opening traversed by said transmission cable.

14. Device according to claim 12, wherein said set comprises means for anchoring said set to a wall of the well.

* * * * *